April 20, 1937.　　　　P. E. GUMM　　　　2,078,136
TIMING AND SIGNALING APPARATUS
Filed July 31, 1936　　　3 Sheets-Sheet 1

INVENTOR.
Percy E. Gumm
BY Lancaster, Allwine and Rommel
ATTORNEYS.

April 20, 1937. P. E. GUMM 2,078,136
TIMING AND SIGNALING APPARATUS
Filed July 31, 1936 3 Sheets-Sheet 2
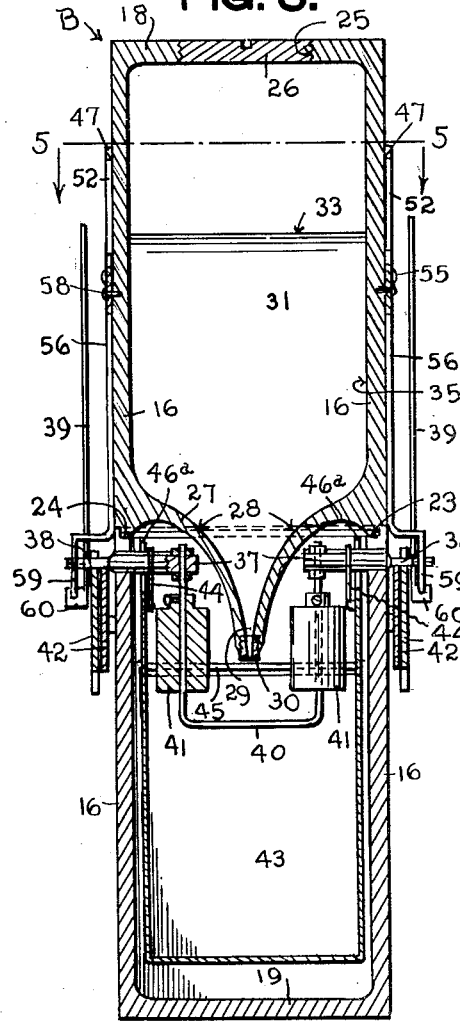
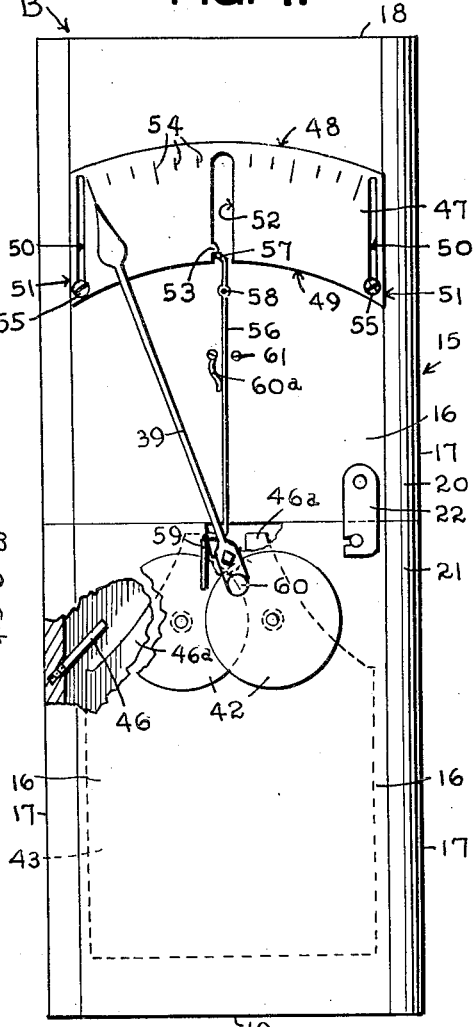
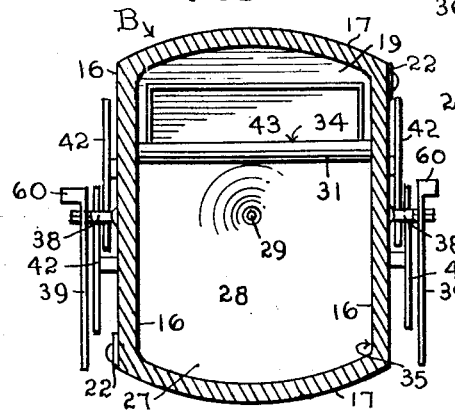
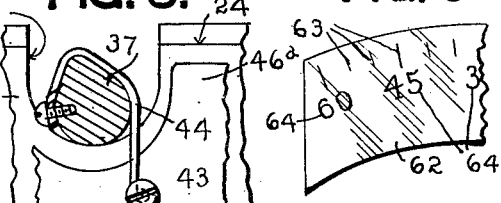
INVENTOR.
Percy E. Gumm
BY Lancaster, Allwine and Rommel
ATTORNEYS.

April 20, 1937.  P. E. GUMM  2,078,136
TIMING AND SIGNALING APPARATUS
Filed July 31, 1936   3 Sheets-Sheet 3
FIG. 6.
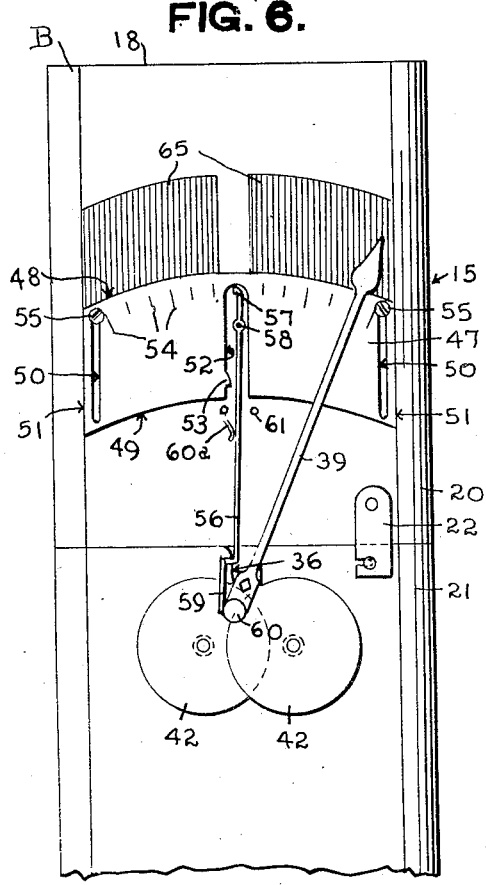
FIG. 10.
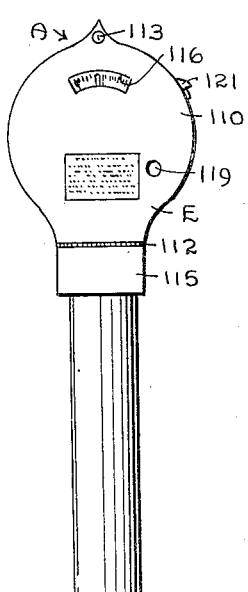
FIG. 11.
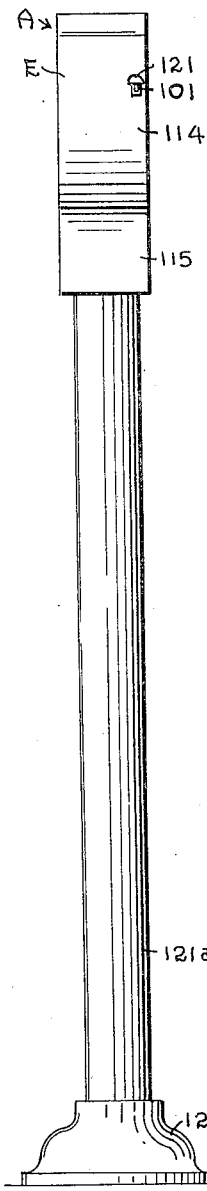
FIG. 7.
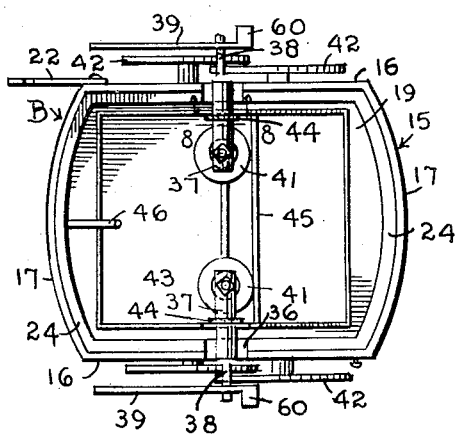
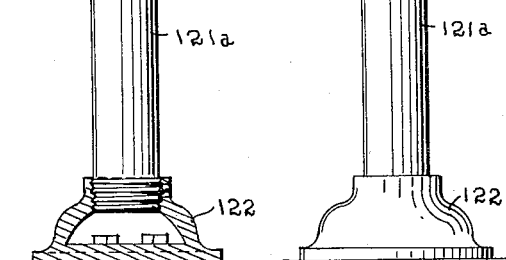
INVENTOR.
Percy E. Gumm
BY Lancaster, Allwine & Rommel
ATTORNEYS.

Patented Apr. 20, 1937

2,078,136

UNITED STATES PATENT OFFICE 2,078,136

TIMING AND SIGNALING APPARATUS

Percy E. Gumm, Oklahoma City, Okla.

Application July 31, 1936, Serial No. 93,698

14 Claims. (Cl. 161—15)

This invention relates to time controlling mechanism and more particularly to mechanism for measuring service or accommodation in terms of elapsed time and requiring prepayment for such service or accommodation. A specific use of the invention is in connection with parked vehicles, for indicating the prepayment for the time such vehicles are parked and indicating if such prepayment has not been made and whether or not the time for which said prepayment has been made has expired.

The principal object of the invention is the provision of a time controlling mechanism dispensing with the use of clockwork, springs, complicated parts and parts particularly liable to damage by tampering and jarring as well as extreme changes in temperature.

Another important object is to provide a quick-acting resetting mechanism, so that the apparatus may be in condition to measure the parking time of one vehicle after another in rapid succession.

Still another object is to provide a parking meter which will indicate for how much time the vehicle has been parked, how much time, of a time limit, remains and, when such limit has expired, will indicate overtime parking.

Other objects and advantages of this invention will be apparent during the course of the following description, taken in connection with the accompanying drawings, forming a part of this specification and in which drawings:—

Figure 3 is an enlarged vertical transverse section through the major operating portions of the novel mechanism.

Figure 4 is a front elevation of the portion shown in Figure 3, the mechanism being set to commence operation, a fragment being broken away to better illustrate a portion of the construction.

Figure 5 is a section upon substantially the line 5—5 of Figure 3, a small section of the signal mechanism being omitted so as to better show other portions of the mechanism directly below the signal mechanism.

Figure 6 is a view somewhat similar to Figure 4, but with the time limit of operation of the mechanism expired.

Figure 7 is a top plan view of the lower portion of the major operating mechanism.

Figure 8 is an enlarged fragment substantially upon the line 8—8 of Figure 7.

Figure 9 is a fragment of a replaceable indicia-carrying member forming a portion of the construction of the apparatus.

Figure 10 is a front elevation of an enclosure housing the novel mechanism.

Figure 11 is a side elevation of the enclosure shown in Figure 10.

Figure 1:
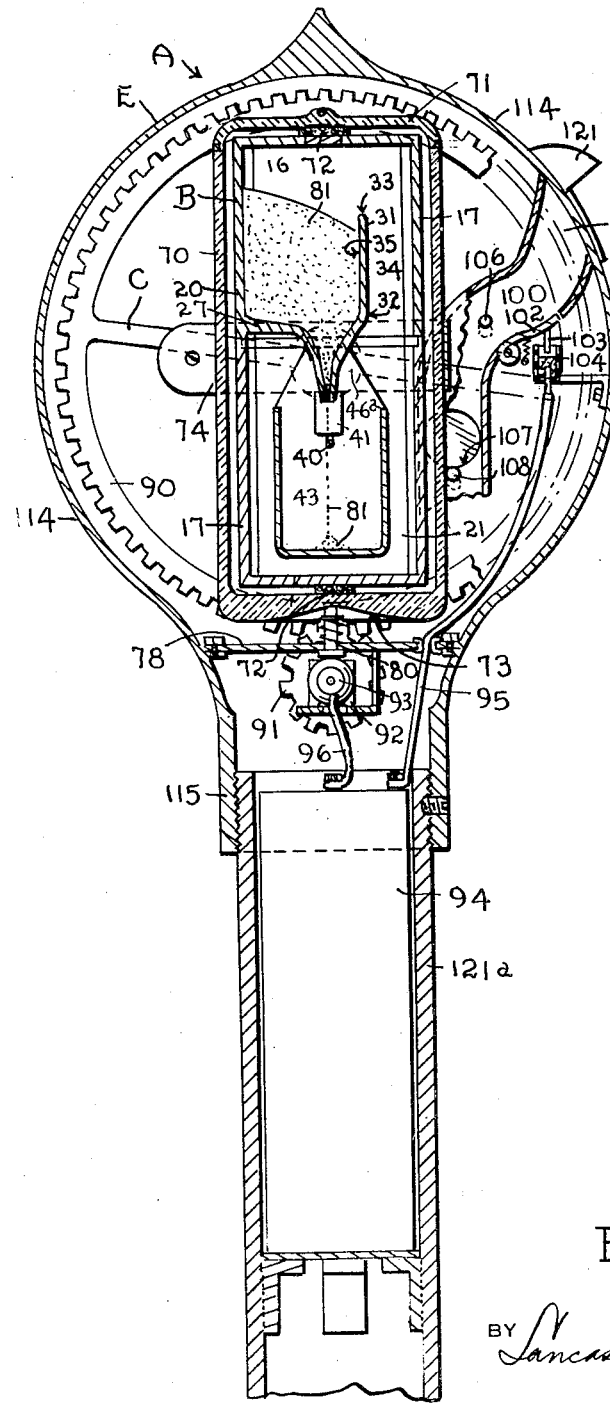
Figure 1 is a longitudinal vertical section through the major operating portions of the novel mechanism.
Figure 2:
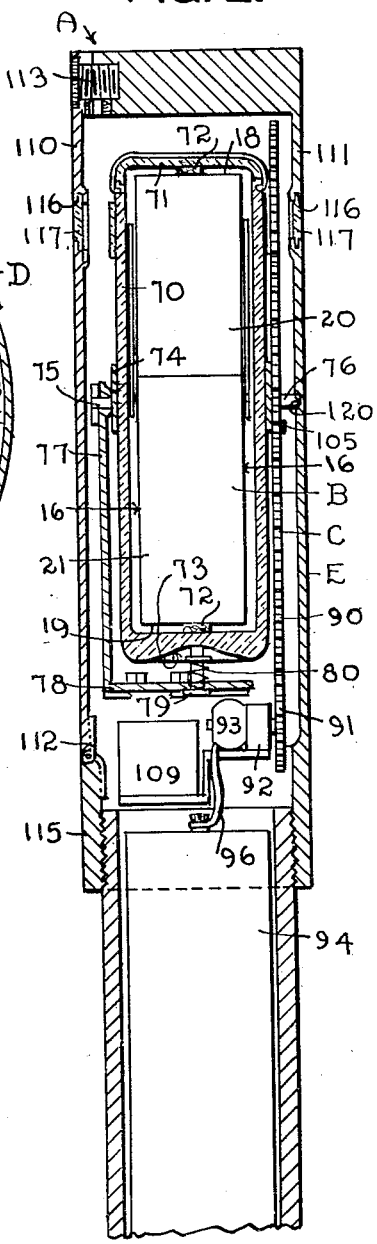
Figure 2 is a transverse vertical section through portions of the same.

In the drawings, wherein for the purpose of illustration is shown a preferred embodiment of the invention and wherein similar reference characters designate corresponding parts throughout the several views, the letter A may designate the entire assembly, illustrated as a vehicle parking meter, including the time-controlling mechanism B, means C for resetting said mechanism, check-controlling means D, and an enclosure E for A, B, C and D.

As stated, the entire assembly is embodied, for illustration, in a vehicle parking meter, with which the time-controlling mechanism B is particularly adapted for association.

This mechanism B includes a housing 15, comprising like, substantially paralleling, elongated side walls 16, substantially like, elongated end walls 17, joining the side walls, a top or upper wall 18, and a bottom or lower wall 19, both joining the side and end walls. The end wall 17 may be arcuate, as shown in Figures 5 and 7.

As for the housing itself, it preferably comprises two sections or portions, an upper one 20 and a lower one 21, suitably detachably secured together, as by latches 22, and provided with means to afford a tight seal, such as a washer or gasket 23, or the like, disposed upon a shoulder 24 at the open end of the portion 21. If desired, the upper portion 20 may be provided with an inlet opening 25 extending through the axial center of the wall 18, this opening 25 having a suitable closure 26. Preferably, this portion 20 also carries a substantially funnel-shaped partition 27 which may extend from one end wall 17 but fall short of the opposite end wall 17, as shown particularly in Figures 1 and 5, and joining a portion of the side walls 16. This partition 27 has a depression or sloping surface 28 sloping towards the center of the partition and downwardly from its upper face. From the center of this depression extends a relatively small opening or outlet 29 which is adapted to receive a suitable nozzle 30, the opening therethrough being of a desired size. Preferably, the nozzle 30 is detachable so that any selected nozzle, having an opening of a desired diameter, may be employed.

Preferably, from the point where the partition 27 ends there extends upwardly, or longitudinally of the housing 15, a second partition 31. This partition 31 falls short of the top wall 18, as shown particularly in Figures 1 and 3, and as shown particularly in Figure 1 it will be seen that the partition 31 faces the end walls 17 and in Figure 5 that this partition joins the side walls 16. Consequently, there are provided two openings leading into the upper portion of the funnel-shaped partition 27,—an opening 32 between one end wall 17 and the partition 31 and an opening 33 between the upper end of the partition 31 and the top wall 18, with a by-pass or passageway 34 extending from the opening 32 to the opening 33.

It should be noted that the axis of the opening 29 in the funnel-shaped partition 27 extends along the longitudinal axis of the housing 15, that the passageway 34 and the openings 32 and 33 are substantial ones, and that one end wall 17, portions of the side walls 16, the partition 27 and the partition 31 define a substantial receptacle or bin 35, for a purpose later described.

The lower portion 21 is preferably provided with a pair of opposite substantially U-shaped openings 36 extending from the open end of this portion into the walls 16. Each opening is preferably disposed an equal distance from the end walls 17 and provide openings for a portion of the mechanism to be next described.

Extending through each opening 36 is a like shaft 37. These shafts 37, as may be seen in Figure 8, are somewhat ovoid in cross section and extending outwardly from each shaft is a substantially cylindrical portion 38, reduced in diameter, and terminating preferably in a squared end. Carried by each squared end is a suitable index or pointer 39. The two shafts are joined by a substantially U-shaped portion 40 which may be suitably detachably secured thereto, as by nuts. Carried by each arm of the U-shaped portion 40 is a suitable counterweight 41, preferably having a bore accommodating the said arm of the U-shaped portion 40, for sliding engagement but provided with a suitable means for detachably securing the counterweight 41 to fixed positions along the arm.

So as to provide for the elimination of as much friction as possible, each cylindrical portion 38 of the shaft is disposed upon the periphery of a pair of overlapping revolving discs 42, as is well known in the art.

Swingingly supported by the shafts 37 is a basket or receptacle 43, spaced from the inner faces of the side and end walls 16 and 17 and bottom wall 19. This receptacle 43 has an upwardly opening mouth, with the axis of the outlet 29 substantially intersecting the axial center of this mouth. Any suitable flexible means 44 may be provided to suspend the receptacle 43 from the shafts 37. For instance, a section of small link chain has been found desirable for this purpose, a separate length of the chain extending from opposite sides of the receptacle 43 over the shafts 37, substantially as shown in Figures 3, 7 and 8, and secured to the shafts 37 in any approved way. The reason for the ovoid cross section of the shafts is so that as the shafts, carrying the counterweights 41, are not rotated and the chains 44 unwind, the distance of the chains from their points of contact with the shafts to the axes of the shafts will gradually increase, as is apparent, thus compensating for the increased or decreased pull of gravitation upon the ascending or descending counterweights 41. Extending across the receptacle 43, is a rod 45 which is adapted to limit the extent the counterweights 41 may travel in one direction. Projecting from one of the end walls 17 is an upwardly and inwardly extending stop 46, which limits the extent the counterweight may travel in the opposite direction, and the side walls of the receptacle 43 are continued upwardly as arms 46ª, these having flat upper ends which abut the partition 27 when the mechanism is upside down and prevent rocking of the receptacle.

Adapted to slide upon the outer face of each side wall 16, is a combined shutter and indicia-carrying member 47. Preferably, these members 47 comprise a flat plate, having arcuate top and bottom edges 48 and 49, as shown in Figures 4 and 6, and provided with slots 50, adjacent the opposite end edges 51. These slots 50 preferably extend from closely adjacent the top edges 48 to adjacent the bottom edges 49. Substantially midway the end edges 51, the shutter 47 is provided with an inverted U-shaped opening 52, extending from the bottom edge 49 to short of the top edge 48. It will be noted that close to the mouth of the opening 52, there is provided an inwardly extending shoulder 53. The indicia is disposed upon the outer face of each shutter and, preferably, comprises graduations 54, indicating the divisions of an interval of time, such as the twelve five-minute intervals making up an hour. Extending through the slots 50 are suitable pins 55 so that the shutter 47 will travel in a well defined path.

Pivotally carried by each side wall 16 is a trigger or dog 56 having, preferably, a curved upper end 57, normally in contact with the shoulders 53 when the pins 55 are at the lower ends of the slots 50, as shown in Figure 4. The pivot 58 of the dog 56 is intermediate its ends and substantially upon the longitudinal medial line of the side walls 16. The lower end 59 of the dog 56 may be bent, firstly at substantially a right angle and along the faces of the side walls 16, then forwardly, and then downwardly so that, in the position when the dog is substantially vertical and the end 57 abuts the shoulder 53, the end 59 will be spaced from the preferably enlarged end 60 of the pointer or index 39, but when the index travels in an arc, at the extremity of its travel, the enlarged end 60 will contact the bent end 59 of the dog 56 and will trip the dog 56 so that the curved upper end 57 will be disengaged from the shoulder 53, allowing the shutter 47 to drop with the end 57 entering the opening 52, as is illustrated in Figure 6. So as to cause the curved end 57 of the dogs 56 to reengage the shoulders 53 at the proper time, a small spring 60ª is provided for each dog 56, bearing thereagainst. Travel of each dog in the opposite direction is limited, preferably by a suitable stop 61, as shown in Figures 4 and 6.

It will be noted that, preferably, the indicia upon the shutter comprises only the graduations 54. A separate member 62 is provided containing corresponding graduations 63 and other indicia 64 to be employed in cooperation with the graduations 54 and will be described later.

When the indicia-carrying member and shutter 47 drops as described, it is preferred that it reveal a suitably colored background. Preferably, this background is comprised of two red colored areas 65, provided for a purpose later set out in detail.

Enclosed in the entire housing heretofore described, but not the member 62, is a suitable container 70. This may have somewhat the same contour as the housing 15 but is larger, so that the housing 15 will be spaced from the walls of the container 70. The container 70 may be wholly or partly of glass or other suitable material. It may have a closure 71 of similar or different material, suitably secured in place in any approved means and provided with a washer or other means to seal its interior from the exterior. In fact, it is desired to exhaust as much air as possible from the container 70 after the housing 15 is in place and space the housing 15 from the top and bottom of the container by suitable heat and cold insulator 72. Two of the members 62 heretofore described and illustrated in fragment in Figure 9, are provided and are preferably of transparent material. These may be affixed, however, by transparent cement or the like, to the exterior or interior of the container 70, with their graduations 63 in alignment with the graduations 54 upon the shutter 47. It will be noted that the outer face of the bottom wall of the container 70 is hollowed out providing a centrally disposed recess 73 for a purpose later set out in detail.

Extending about the container 70 may be provided a suitable band 74 in tight engagement with the outer face of the container and from diametrically opposite sides of this band may be spindles 75 and 76. One spindle 75 may extend through a suitable opening in an upwardly extending arm 77 of a base member 78, which base member may also carry a suitable catch 79, normally urged upwardly by a coil spring 80. This catch enters the recess 73 and yieldably holds the container in an upright position, as will be more fully described later.

As means for actually operating the time controlling mechanism, it is preferred to employ fine, sharp, clean and dry sand or other granular material 81, altho other than silicon dioxide may be employed, just so the qualities desired for the sand are inherent in them.

Means C for resetting the mechanism B preferably includes a relatively large gear 90, suitably keyed to one of the spindles,—preferably the spindle 76, and cooperating with a smaller gear 91 which is operatively connected with a conventional speed reducing mechanism 92 which, in turn, is operated by any suitable means, such as an electric motor 93, current being supplied by one or more dry cells, wet batteries, city current or the like. In the example shown, a relatively large dry cell 94 supplies the necessary current, to suitable conductors or leads 95 and 96. It is obvious that other means may be provided to reset the mechanism B, but the means just described has been found practical and efficient.

With the means just described, a conventional check controlled means D may be provided, such as including a coin chute 100 opening at one end in a slot 101 and extending to a pivoted platform 102 carrying a suitable contact point 103 adapted to normally extend towards but free of a mercury containing cup 104, the mercury of which is electrically connected with the conductor 95. Any suitable means may be provided to temporarily arrest the passage of a coin or check through the chute 100, so that the coin will come to rest upon the platform 102 and its weight will depress the platform 102 so that the contact point 103 will enter the mercury and close an electric circuit between the dry cell 94 and the motor 93, energizing the latter and causing operation of the speed reduction mechanism 92, rotation of the gears 91 and 90, rotation of the spindles 75 and 76, turning of the band 74 and, consequently, an end for end rotation of the container 70 and housing 15. It is now apparent that, with a suitable volume of sand or other granular material 81 in the housing 15, this sand will flow, if it be in the lower portion 21 of the housing 15, from this lower portion 21 through the opening 32, passageway 34 and opening 33 into the bin 35 as the resetting mechanism operates to turn the major portions of the time controlling mechanism B end for end. This flow of the sand will be relatively rapid due to the large by-pass provided by the opening 32, passageway 34 and opening 33. With the sand in the bin 35, it will commence slowly flowing, when the housing 15 is upright, with the top wall 16 uppermost, through the funnel opening 29 and drop into the basket 43 and gradually it will accumulate therein so that the basket will slowly sink. This will cause gradual unwinding of the chain 44 from over the shafts 37, and gradual rotation of these shafts. This rotation of the shafts will cause gradual travel of the indices 39 over the faces of the shutters 47. When the indices have traveled a sufficient distance, their enlarged ends will cause operation of the dogs 56 and dropping of the shutters 47, as has been described. As the shutters drop, the red backgrounds 65 will be revealed, providing a signal that the time limit, for which prepayment for parking time has been made, has expired. As the gear 90 rotates, a suitable pin 105 disposed upon the gear 90, will contact the means for temporarily arresting passage of the coin or check as described. This means may be a catch 106 extending partly into the chute 100 and the contact of the pin 105 with the catch 106 will cause the latter to temporarily recede from the chute passageway and allow the coin to resume its passage through the chute 100. If desired, the chute 100 may have a glass covered opening 107 and a second catch 108, preferably similar to the catch 106, just below the opening 107, so that the passage of the coin or check is temporarily arrested for a second time and its presence will be revealed by a view of it through the opening 107. The coin or check will be held in view, as described, until the next coin is deposited for, as the gear is rotated by the contact made by the second coin, the same pin 105 will temporarily withdraw the catch from the passageway through the chute 100 and the first coin will continue through the chute to a suitable coin receptacle 109. As the pin 105 releases the catches 106 and 108, these catches will reenter the passageway through the chute in readiness to temporarily arrest the passage of the next coin or check. It is preferred that the pin 105, carried by the gear 90, be positioned between the catch 106 and 108 when the gear 90 comes to rest. Consequently, it will first trip the catch 108 as the gear 90 commences to revolve, carrying the coin controlling mechanism with it, then trip the catch 106 and releasing the coin or check so that the platform 102 will rise and electrical contact will be broken thus stopping the motor and, consequently, further movement of the time controlling mechanism in its end for end travel.

Assuming that the shutter 47 has dropped, as the housing 15 is turned end for end, gravity will cause the shutter 47 to travel towards the top wall 15, when this wall is temporarily lowermost, and allow the curved end 57 of the trigger or dog 56 to reengage the shoulder 53 of the shutter 47 so that, when the housing again assumes its upright position, the shutter will cover the red backgrounds, and the graduations upon the shutter and the transparent member 52 will coincide, as stated.

The tension of the spring 80 about the catch 79 and the shape of the recess 73 are such that the starting of the motor and consequent rotation of the time controlling mechanism will permit the surface of the recess 73 to slide over the end of the catch 79, depressing the spring 80, but when further operation of the motor is discontinued, as has been stated, the catch 79, urged by the spring 80, will be sufficient, when the catch reenters the recess 73, to hold the time controlling mechanism in its upright position.

The enclosure E for A, B, C and D, may have a pair of suitable side walls 110 and 111, one preferably hinged as 112, and provided with a suitable lock 113, end wall 114 joining the side walls 110 and a screw threaded collar 115 extending from the lower portions of these walls. Each side wall 110 and 111 may have a suitable arcuate opening 116 covered by a transparency 117, such as glass, these openings coinciding with the shutters 47 when the latter are in their raised positions and the housing 15 is disposed with the top wall 18 uppermost. One wall 111 may also have an opening 118 coinciding with the coin view opening 107 in the chute 100, and a second bearing 120 for the spindle 76, this bearing opening from the inner face of the wall 111. An end wall 114 may also have a coin slot 101 communicating with the chute 100. This slot 101 may be provided with a conventional rain and dust shield 121.

The assembly thus described may be carried upon a suitable hollow pedestal 121ª which preferably screws into the collar 115 at its upper end and extends from a suitable base 122. This base may be firmly secured to any foundation, such as pavement, curbing, etc.

From the foregoing it is apparent that an apparatus is provided which is free from clock work, such as springs, ratchets, and other devices liable to get out of order and be seriously affected by heat and cold as well as jolting and shock otherwise incurred. The operating means is sand, or a similar granular substance, the sand being inexpensive and not subject to changes due to temperature. Unlike some check-controlled, time-controlling mechanisms, the apparatus herein described will not operate to extend the parking time by quickly depositing a second coin right after the deposition of a first coin, for the first coin will act to cause one complete end for end revolution of the time controlling mechanism, whereupon the first coin will travel to the sight opening and the second coin will immediately cause a second end for end revolution of the time-controlling mechanism before the time-controlling mechanism has had an opportunity to actually function. The person parking a vehicle and prepaying for the parking interval, will know at all times how much time he has remaining by observing the position of either of the indices, and the dropping of the shutter will immediately indicate that this time limit has wholly expired.

Various changes may be made to the form of invention herein shown and described, without departing from the spirit of the invention or the scope of the claims.

What is claimed is:

1. In a time-controlling mechanism, an elongated housing including top and bottom walls and a partition dividing the interior of said housing into an upper chamber and a lower chamber, said partition being provided with a depression extending towards said bottom wall and an opening therethrough at substantially the lowermost portion of said depression, said housing having a by-pass extending from one of said chambers to the other chamber, and time-indicating means carried by said housing, including a rotating member, a receptacle, having an upwardly opening mouth, disposed in said lower chamber with the axis of said opening extending into said mouth and flexible means suspending said receptacle from said rotating member with said receptacle spaced from said bottom wall.

2. In a time-controlling mechanism adapted to be operated by granular material, such as sand, an elongated housing including top and bottom walls, upper and lower chambers, and provided with a bin having a mouth opening towards said top wall and into said upper chamber, said bin having a bottom wall with a depression in said bottom wall and a granular material flow opening through said wall at said depression, said opening communicating between said bin and said lower chamber, said housing having a by-pass extending from one of said chambers to the other, and time-indicating means carried by said housing, including a rotating member, a receptacle, having an upwardly opening mouth, disposed in said lower chamber with the axis of said opening extending into said mouth, and flexible means suspending said receptacle from said rotating member with said receptacle spaced from said bottom wall.

3. In a time-controlling mechanism adapted to be operated by granular material, such as sand, an elongated housing including top and bottom walls, upper and lower chambers, and provided with a bin having a mouth opening towards said top wall and into said upper chamber, said bin having a bottom wall with a depression in said bottom wall and a granular material flow opening through said wall at said depression, said opening communicating between said bin and said lower chamber, said opening being of a size whereby said granular material will flow therethrough in a fine stream, said housing having a by-pass extending from one of said chambers to the other, and time-indicating means carried by said housing, including a rotating member, a receptacle, having an upwardly opening mouth, disposed in said lower chamber with the axis of said opening extending into said mouth, and flexible means suspending said receptacle from said rotating member with said receptacle spaced from said bottom wall.

4. In a time-controlling mechanism adapted to be operated by granular material, such as sand, an elongated housing including top and bottom walls, upper and lower chambers, and provided with a bin having a mouth opening towards said top wall and into said upper chamber, said bin having a depression in its bottom wall and a granular material flow opening through said wall at said depression communicating between said bin and said lower chamber, said opening being of a size whereby said granular material will flow therethrough in a fine stream, said housing having a by-pass extending from one of said chambers to the other, and time-indicating means carried by said housing and operated by said granular material flowing through said opening.

5. In a time-controlling mechanism adapted to be operated by granular material, such as sand, a housing including top and bottom walls and elongated side and end walls, a partition extending partly across said housing intermediate said top and bottom walls, said partition having a depression extending towards said bottom wall and a small-diametered opening at substantially the lowermost portion of said depression, a second partition extending from said first partition upwardly towards said top wall and falling short thereof, said second partition joining two walls of said housing and spaced from the other walls thereof and index operating means carried by said housing, including a shaft rotatably supported thereby, an open container with its mouth intersected by the axis of said opening, a length of flexible material wound over said shaft and suspending said container therefrom spaced from said bottom wall and an index carried by said shaft.

6. In a time-controlling mechanism adapted to be operated by granular material, such as sand, a housing including top and bottom walls and elongated side and end walls, a partition extending partly across said housing intermediate said top and bottom walls, said partition having a depression extending towards said bottom wall and a small-diametered opening at substantially the lowermost portion of said depression, a second partition extending from said first partition upwardly towards said top wall and falling short thereof, said second partition joining two walls of said housing and spaced from the other walls thereof, index operating means carried by said housing, including a shaft rotatably supported thereby, an open container with its mouth intersected by the axis of said opening, a length of flexible material wound over said shaft and suspending said container therefrom spaced from said bottom wall and an index carried by said shaft, and means to rotate said housing upon a transverse axis thereof.

7. In a time-controlling mechanism adapted to be operated by granular material, such as sand, a housing including top and bottom walls and elongated side and end walls, a partition extending partly across said housing intermediate said top and bottom walls, said partition having a depression extending towards said bottom wall and a small-diametered opening at substantially the lowermost portion of said depression, a second partition extending from said first named partition upwardly towards said top wall and falling short thereof, said second partition joining two walls of said housing and spaced from the other walls thereof, said opening in said first named partition being of a size whereby said granular material will flow therefrom in a fine stream, time-indicating means carried by said housing and operated by said granular material flowing through said opening, and means to rotate said housing upon a transverse axis thereof.

8. In a vehicle parking meter, timing means including granular material, an elongated housing enclosing said granular material, said housing having a transversely disposed partition dividing said housing into an upper chamber and a lower chamber, said partition having a sloping surface extending towards said lower chamber and an opening at the lowermost portion of said sloping surface, said opening communicating between said upper and lower chambers and being of a diameter whereby granular material will flow therethrough into said lower chamber in a fine stream, a rotatable member in said lower chamber and extending through the wall of said housing, a receptacle in said lower chamber, a flexible element secured to said receptacle and extending over said rotatable member and secured thereto, the length of said element and the size of said receptacle being such that said receptacle normally will be free of the walls of said housing, the axis of said opening extending into the mouth of said receptacle, timing indicia disposed upon the outer wall of said housing an index secured to said rotatable member at the portion thereof exterior of said housing, said index being positioned so as to point to said indicia.

9. In a vehicle parking meter, the combination of timing means, including granular material, an elongated housing enclosing said granular material, said housing having a transversely disposed partition dividing said housing into an upper chamber and a lower chamber, said partition having a sloping surface extending towards said lower chamber and an opening at the lowermost portion of said sloping surface, said opening communicating between said upper and lower chambers and being of a diameter whereby granular material will flow therethrough into said lower chamber in a fine stream, a by-pass for said granular material extending from one of said chambers to the other and past said partition, a rotatable member in said lower chamber and extending through the wall of said housing, a receptacle in said lower chamber, a flexible element secured to said receptacle and extending over said rotatable member and secured thereto, the length of said element and the size of said receptacle being such that said receptacle normally will be free of the walls of said housing, the axis of said opening extending into the mouth of said receptacle, timing indicia disposed upon the outer wall of said housing and an index secured to said rotatable member at the portion thereof exterior of said housing, said index being positioned so as to point to said indicia, and means to rotate said housing upon a transverse axis thereof, whereby granular material in said receptacle will flow through said by-pass into said upper chamber and be disposed upon the sloping surface of said partition.

10. In a vehicle parking meter, the combination of timing means, including granular material, an elongated housing enclosing said granular material, said housing having a transversely disposed partition dividing said housing into an upper chamber and a lower chamber, said partition having a sloping surface extending towards said lower chamber and an opening at the lowermost portion of said sloping surface, said opening communicating between said upper and lower chambers and being of a diameter whereby granular material will flow therethrough into said lower chamber in a fine stream, a by-pass for said granular material extending from one of said chambers to the other and past said partition, the diameter of said by-pass being greatly in excess of the diameter of said opening, a rotatable member in said lower chamber and extending through the wall of said housing, a receptacle in said lower chamber, a flexible element secured to said receptacle and extending over said rotatable member and secured thereto, the length of said element and the size of said receptacle being such that said receptacle will be free of the walls of said housing, the axis of said opening extending into the mouth of said receptacle, timing indicia disposed upon the outer wall of said housing and an index secured to said rotatable member at the portion thereof exterior of said housing, said index being positioned so as to point to said indicia, and means to rotate said housing upon a transverse axis thereof, whereby granular material in said receptacle will flow through said by-pass into said upper chamber and be disposed upon the sloping surface of said partition.

11. In a vehicle parking meter, the combination of timing means including granular material, an elongated housing enclosing said granular material, said housing having a transverse partition dividing said housing into an upper chamber and a lower chamber, said partition having a sloping surface extending towards said lower chamber and an opening at the lowermost portion of said sloping surface, said opening communicating between said upper chamber and said lower chamber, a by-pass for said granular material extending from said lower chamber to said upper chamber and past said partition, a rotatable member in said lower chamber and extending through the wall of said housing, a receptacle in said lower chamber, a flexible element secured to said receptacle and extending over said rotatable member and secured thereto, the length of said element and the size of said receptacle being such that said receptacle normally will be free of the walls of said housing, the axis of said opening extending into the mouth of said receptacle, a shutter slidable longitudinally over the exterior surface of the wall of said housing, said shutter being provided with timing indicia disposed upon its outer surface, an index secured to said rotatable member at the portion thereof exterior of said housing, said index being positioned so as to point to said indicia upon said shutters, a latch pivoted to the exterior of said housing below said shutter and normally latching said shutter in an upper position, the lower end of said latch being out of tripping contact with said index when said shutter is latched in said upper position and in tripping contact with said index when said index is in another position, whereby said latch will unlatch said shutter and permit it to drop by gravity, and means to rotate said housing upon a transverse axis thereof whereby said granular material will flow from said lower chamber through said by-pass into said upper chamber and be deposited upon said sloping surface and said shutter will slide longitudinally over the exterior surface of said housing wall into a position to be again latched by said latch.

12. In a vehicle parking meter, the combination of timing means including granular material, an elongated housing enclosing said granular material, said housing having a transverse partition dividing said housing into an upper chamber and a lower chamber, said partition having a sloping surface extending towards said lower chamber and an opening at the lowermost portion of said sloping surface, said opening communicating between said upper chamber and said lower chamber, a by-pass for said granular material extending from said lower chamber to said upper chamber and past said partition, a rotatable member in said lower chamber and extending through the wall of said housing, a receptacle in said lower chamber, a flexible element secured to said receptacle and extending over said rotatable member and secured thereto, the length of said element and the size of said receptacle being such that said receptacle normally will be free of the walls of said housing, the axis of said opening extending into the mouth of said receptacle, a shutter slidable longitudinally over the exterior surface of the wall of said housing, said shutter being provided with timing indicia disposed upon its outer surface, an index secured to said rotatable member at the portion thereof exterior of said housing, said index being positioned so as to point to said indicia upon said shutter, a latch pivoted to the exterior of said housing below said shutter and normally latching said shutter in an upper position, the lower end of said latch being out of tripping contact with said index when said shutter is latched in said upper position and in tripping contact with said index when said index is in another position, whereby said latch will unlatch said shutter and permit it to drop by gravity, indicia disposed upon and exterior face of said housing and concealed by said shutter when said shutter is in said upper position, and means to rotate said housing upon a transverse axis thereof whereby said granular material will flow from said lower chamber through said by-pass into said upper chamber and be deposited upon said sloping surface and said shutter will slide longitudinally over the exterior surface of said housing wall into a position to be again latched by said latch and conceal said last named indicia.

13. In a vehicle parking meter, the combination of timing mechanism including granular material, an elongated housing enclosing said granular material and having a top wall, a bottom wall, an upper chamber and a lower chamber, a bin in said upper chamber having a mouth facing said top wall and a small vent opening into said lower chamber, whereby granular material in said bin will be discharged from said vent in a fine stream, said housing having a by-pass extending from said lower chamber to said upper chamber and past said bin, a receptacle, having a mouth, disposed in said lower chamber with the axis of said vent extending through said mouth, a shaft rotatably carried by said housing, said shaft being substantially ovoid in transverse cross section, flexible means suspending said receptacle from said shaft and free of said bottom wall, with a portion of said means disposed upon a portion of the ovoid periphery of said shaft, a counterweight for said receptacle carried by said shaft and an index operatively connected with said shaft, and means to rotate said housing upon a transverse axis thereof, whereby granular material in said receptacle will flow through said by-pass into said upper chamber and into said bin.

14. In a vehicle parking meter, the combination of timing mechanism including granular material, an elongated housing enclosing said granular material and having a top wall, a bottom wall, an upper chamber and a lower chamber, a bin in said upper chamber having a mouth facing said top wall and a small vent opening into said lower chamber whereby granular material in said bin will be discharged from said vent in a fine stream, said housing having a by-pass extending from said lower chamber to said upper chamber and past said bin, a receptacle, having a mouth, disposed in said lower chamber with the axis of said vent extending through said mouth, a shaft rotatably carried by said housing, said shaft being substantially ovoid in transverse cross section, flexible means suspending said receptacle from said shaft and free of said bottom wall, with a portion of said means disposed upon a portion of the ovoid periphery of said shaft, a counterweight for said receptacle carried by said shaft, a stop for limiting the movement of said counterweight in one direction carried by said housing, a stop for limiting the movement of said counterweight in the opposite direction, carried by said receptacle and an index operatively connected with said shaft, and means to rotate said housing upon a transverse axis thereof, whereby granular material in said receptacle will flow through said by-pass into said upper chamber and into said bin.

PERCY E. GUMM.